United States Patent [19]

Marconi et al.

[11] 4,263,180

[45] Apr. 21, 1981

[54] METHOD FOR OCCLUDING SEQUESTERING AGENTS IN FILAMENTARY STRUCTURE, OCCLUDED SEQUESTERING AGENTS THUS OBTAINED AND THEIR APPLICATIONS

[75] Inventors: Walter Marconi, San Donato Milanese; Francesco Bartoli, Rome; Silvio Gulinelli, Monterotondo; Franco Morisi, San Giovanni in Persiceto; Delio Zaccardelli, Monterotondo, all of Italy

[73] Assignee: Snamprogetti S.p.A., Milan, Italy

[21] Appl. No.: 692,773

[22] Filed: Jun. 4, 1976

[30] Foreign Application Priority Data

Jun. 6, 1975 [IT] Italy ................... 24081 A/75

[51] Int. Cl.³ .............................................. C08L 89/00
[52] U.S. Cl. ...................................... 260/8; 260/17 R; 264/182; 264/184; 264/203; 525/197; 525/218; 525/221
[58] Field of Search ............... 264/185, 241, 245, 184, 264/246, 255, 169, 171, 175, 170, 182, 203; 521/28, 27; 260/6, 8, 17 R, 17.4 BB, 29.6 RW, 29.6 WA, 29.6 B, 29.6 E, 29.6 PM, 29.7 WA; 210/500 M; 106/158, 197 C, 195, 170, 197 R; 525/183, 185, 197, 198, 218, 221, 417, 432

[56] References Cited

U.S. PATENT DOCUMENTS

| | | | |
|---|---|---|---|
| 1,885,475 | 11/1932 | Persiel et al. ................ | 106/170 |
| 1,954,324 | 4/1934 | Lilienfeld ..................... | 264/207 |
| 2,072,303 | 3/1937 | Herrmann et al. ............ | 264/205 |
| 2,809,943 | 10/1957 | Pye et al. ...................... | 521/28 |
| 2,933,460 | 4/1960 | Richter et al. ................ | 521/28 |
| 2,955,017 | 10/1960 | Boyer ............................ | 264/184 |
| 2,980,635 | 4/1961 | Davis et al. ................... | 521/28 |
| 3,111,370 | 11/1963 | Okamaura et al. ........... | 264/185 |
| 3,242,106 | 3/1966 | Kressman .................... | 521/28 |
| 3,318,988 | 5/1967 | McDowell .................... | 264/171 |
| 3,618,307 | 11/1971 | Jonkoff ......................... | 264/182 |
| 3,770,856 | 11/1973 | Ueki et al. .................... | 264/13 |
| 3,833,708 | 9/1974 | Miller et al. .................. | 264/344 |
| 3,852,401 | 12/1974 | Suzuki et al. ................. | 264/182 |
| 3,896,204 | 7/1975 | Goodman et al. ............ | 264/182 |
| 3,907,958 | 9/1975 | Tsuji et al. .................... | 264/184 |
| 3,914,354 | 10/1975 | Ueki et al. .................... | 264/13 |
| 3,962,398 | 6/1976 | Matsuo et al. ................ | 264/184 |
| 3,991,153 | 11/1976 | Klausner et al. .............. | 264/182 |
| 4,012,571 | 3/1977 | Dean et al. .................... | 260/8 |
| 4,036,803 | 7/1977 | Kabagashi et al. ............ | 264/182 |
| 4,171,987 | 10/1979 | Horiguchi et al. ............ | 264/49 |

FOREIGN PATENT DOCUMENTS

| | | | |
|---|---|---|---|
| 1109361 | 6/1961 | Fed. Rep. of Germany ........ | 521/28 |
| 37-12725 | 9/1962 | Japan .................................... | 264/184 |
| 938743 | 10/1963 | United Kingdom ................ | 521/28 |

Primary Examiner—Jay H. Woo
Attorney, Agent, or Firm—Morgan, Finnegan, Pine, Foley & Lee

[57] ABSTRACT

A method is disclosed for embedding sequestering agents in filamentary structures, the method comprising the steps of preparing an emulsion formed by an aqueous or nearly aqueous solution of the sequestering agent and a solution of the filament-forming polymer in an appropriate solvent, and spinning the emulsion in a coagulation bath.

5 Claims, No Drawings

METHOD FOR OCCLUDING SEQUESTERING AGENTS IN FILAMENTARY STRUCTURE, OCCLUDED SEQUESTERING AGENTS THUS OBTAINED AND THEIR APPLICATIONS

This invention relates to sequestering agents occluded in filamentary structures, the method for their preparation and their uses.

It is known that it is possible to prepare porous fibers occluding enzymes which retain, thus immobilized, their catalytic properties, while preventing the enzyme from being set free and scattered in the reaction mass and thus a possible pollution of the reaction product.

The filamentary structures which can be used and the method for occluding the enzymes are those as disclosed in the Italian Patent Specification No. 836 462, according to which the enzyme-occluding fibers can be prepared starting from polymer solutions which are capable of giving fibers in which enzyme preparations are dispersed in the form of very tiny droplets in the order of magnitude of the emulsions.

The emulsion thus obtained can be wet spun or dry spun to give a fiber which exhibits in its interior tiny hollow spaces in which the enzymes are arranged, these latter being separated by the external environment by a thin membrane which prevents the enzyme from emerging towards the outside and being scattered in the reaction mass while, however, enabling the enzyme to unfold its catalytic action.

We have now found that, by employing techniques which are similar to those as employed for the enzymes, it is possible to occlude chelation agents in porous structures, and also ion-exchanging compounds and in general products which are capable of withdrawing one or more sunstances having a definite chemical structure from solutions or also from biological liquors.

The structure thus obtained have a high activity due to the high surface-to-volume ratio, and the method for obtaining them is extremely cheap and is simple to perform.

In addition, by occluding such sequestering agents or ion-exchanging compounds having a high molecular weight, their emersion from the fiber is prevented so that they, once they have been regenerated, can be used for a virtually unlimited number of times.

The filamentary structures which occlude sequestering agents, the subject-matter of this invention, find their use in a number of fields of application such as the withdrawal of ions the presence of which is detrimental in industrial processes, the purification of industrial waters, the treatment of sewage waters, the selective extraction of metals from diluted solutions, the extraction of coenzymes and enzyme-inhibitors with methods which are akin to those of affinity chromatography.

It is apparent that the molecular weight differential between the substances which are occluded in the fibers and the substances to be sequestered should be such as to encourage the diffusion, towards the interior of the fiber, of the substance(s) to be sequestered until reaching the sequestering agent which, due to its heavier molecular weight, remains occluded in the fiber.

The method for the preparation of the aforementioned filamentary structures is carried out, as outlined above, in a way which is similar to that of enzyme-occlusion. More particularly, it provides for the following sequence of steps:

(a) Dissolution or dispersion of the substance to be occluded, in water, or in a mixture of water and glycerol; or also in a solvent which is immiscible with the solvent for the polymer.

(b) Addition of the solution or suspension as per (a) above to a polymer in solution.

(c) Stirring until a homogeneous emulsion is obtained.

(d) Spinning of the emulsion (c) through a spinneret submerged in a coagulation bath.

(e) Removal of the coagulation liquor and of the solvent for the polymer from the fiber by treatment in a stream of air or another gas, if necessary.

The spinning conditions and the properties of the polymers to be used are those disclosed in the Italian patent referred to above.

Among the preferred polymer materials for the preparation of the fibers according to the invention there can be listed the cellulose polymers, the esterified or nitrated cellulosic polymers, especially the polymers of cellulose triacetate. Other polymers which can be employed are polyethylene, the polyamides, the acrylonitrile polymers or copolymers, butadiene or isoprene, acrylates, metacrylates, vinyl esters, vinyl chloride, polymers or copolymers or vinylidene, styrene, vinylbutyrate, gamma-methyl glutamate and the like.

The products to be occluded can be both water soluble and soluble in nonaqueous solvents provided that the two phases, the one containing the fiber-forming polymer and that containing the sequestering agent, are immiscible and can thus originate an emulsion. Among the substances which can be occluded there can be enumerated, for example, dextrans which can variously be substituted and are soluble in water, polyvinyl alcohol, acrylamideacrylic acid copolymers and others.

It is also possible to occlude substances which have sequestering agents and which can finely be dispersed in a solvent which is immiscible with the solvent for the polymer, such as carboxymethylcellulose, p.aminobenzylcellulose and others.

The fibers prepared in this way are adapted to withdraw in a more or less selective manner from the medium, substances such as metal ions, substances of biological interest such as lower peptides, coenzymes, toxic substances as produced by the metabolism of medicaments and others.

The processing details will become more clearly apparent from the scrutiny of the illustrative examples which follow; the invention, however, should not be construed as being restricted thereby.

EXAMPLE 1

4 grams of cellulose triacetate (Fluka) are dissolved in 53 grams of methylene chloride (a pure reagent by C. Erba) at room temperature.

The polymer solution, which had been previously cooled at 0° C., is supplemented with 8 grams of a 33% aqueous solution of polyethyleneimine hydrochloride (weight to weight ratio) (Polysciences Inc., Warrington, USA). Stirring is continued until obtaining a homogeneous emulsion which is allowed to stand during 30 minutes.

The emulsion is then transferred into a steel cylinder connected at its top with a nitrogen bottle and, at the bottom, with a spinneret submerged in a toluene-containing coagulation bath.

By impressing a nitrogen pressure, the emulsion emerges from the spinneret and, being passed through the toluene bath, is coagulated.

The resultant filaments are collected on a roller and then treated with an air stream to remove both toluene and methylene chloride.

600 milligrams of the fiber have been contacted by 50 mls of a copper solution at the concentration of 18.3 parts per million (p.p.m.), which has been obtained by dissolving $CuSO_4 \cdot 5H_2O$ in distilled water.

After a 4-hour contact at room temperature, 1.2 p.p.m. of copper have been found in the solution. The analyses have been carried out with the atomic-absorption detector Varian Techtron 1200 at a wavelength of 324.7 nm. Then the fiber has been washed with 50 mls. of 1-N HCl and in the washing liquor 16.8 p.p.m. of copper have been detected. 50 additional mls of the copper solution as described above have been treated with the same fiber. After a 4-hour contact in solution, 0.9 p.p.m. of copper have been detected. The fiber has been washed with 50 mls of 1-N HCl and 17.3 p.p.m. of copper have been detected.

The method as described above has been repeated 10 additional times with the same fiber sample without the same fiber exhibiting any decrease of its copper-binding power.

EXAMPLE 2

An aqueous solution of potassium bichromate (pure reagent by C. Erba) has been prepared at the concentration of 100 milligrams per liter at a pH of 6.0.

By diluting said solution with water, there have been prepared a number of solutions to be used for obtaining a standard curve by measuring the absorption of the same solutions at 350 nm in a boat having a wall thickness of 1 centimeter with the Unicam SP 1800 Spectrophotometer (Pye Unicam, Cambridge, England).

One liter of a solution containing 20 milligrams per liter of potassium bichromate has been supplemented with one gram of a polyethyleneimine-containing fiber prepared according to Example 1. After a 1-hour contact at room temperature the optical density of the solution has been read out as described above and, by using the standard curve, the concentration of the potassium bichromate present in the solution has been calculated and was found to be 3.5 milligrams per liter.

It has thus been detected that the fiber has bound 16.5 milligrams of potassium bichromate.

By subsequently treating the fiber with 10 mls of 2-N HCl, potassium bichromate has been quantitatively recovered. After having used the same fiber for 10 steps such as described hereinabove, no variations have been detected in the fiber behaviour.

EXAMPLE 3

It is known that albumin, due to the numerous —SH groups present in its molecule, is capable of binding metals such as mercury. In 10 mls of a 0.01 M phosphate buffer of a pH of 7.0 and containing glycerol (30% volume to volume ratio) there have been dissolved 500 milligrams of beef albumin (Calbiochem, Los Angeles, USA). This solution has been emulged with a solution obtained by dissolving 5 grams of cellulose triacetate in 70 grams of methylene chloride and a fiber has been prepared according to the procedure described in EXAMPLE 1.

2 grams of moist fiber have been contacted by 50 mls of a solution of mercury chloride in distilled water, in which 93.5 p.p.m. of mercury had been detected, by an atomic absorption reading (Varian Techtron 1200, with a single-element, hollow cathode lamp, wavelength 253.7 nm. After a 1-hour contact with the fiber at room temperature, 34 p.p.m. of Hg have been detected with the already described method. The result has thus been that the fiber had removed 2.98 milligrams of mercury to the solution.

EXAMPLE 4

500 milligrams of poly-L-lysine hydrobromide (Koch-light, Buchs, England) have been dissolved in 10 mls of 0.01 M phosphate buffer at a pH of 7 and containing 30% glycerol. This solution has been added to a solution prepared by dissolving 5 grams of cellulose triacetate in 68 grams of methylene chloride. The two solutions have been emulged at 0° C. whereafter a fiber has been prepared according to the procedure disclosed in Example 1.

650 milligrams of wet fiber have been added to 100 mls of a solution of pyridoxal-5-phosphate at the concentration of $1.10^{-4}$ M in a 0.01 M, pH8, phosphate buffer. After a 1-hour contact at room temperature, the fiber, which had meanwhile become darkly tinted in yellow due to the formation of a Schiff's base between poly-L-lysine and pyridoxal-5-phosphate, has been withdrawn from the solution.

With the Beckam DU-2 spectrophotometer at 390 nm with a 1- centimeter thick glass boat, an absorbence of 0.570 has been detected on the pyridoxal-5-phosphate solution prior to contacting the fiber. After a 1-hour contact with the fiber, the absorbence was 0.290. From a standard curve, which had been prepared by measuring the absorbence at 390 nm of solutions of pyridoxal-5-phosphate at various concentrations, it has been detected that the concentration of the solution which contacted the fiber had become $0.5 \cdot 10^{-4}$ M. Thus the fiber, which had bound 13.25 milligrams of pyridoxal-5-phosphate, washed with 100 mls of a 0.01 M, pH 4 buffer has yielded to the solution the pyridoxal-5-phosphate. After an additional washing with 2- N HCl and distilled water, it has been used again for removing the pyridoxal-5-phosphate from a solution identical to that described above, the same results having been obtained.

EXAMPLE 5

10 grams of cellulose triacetate (Fluka) have been dissolved in 133 grams of methylene chloride. A solution obtained by dissolving 250 milligrams of polyacrylic acid (Polyscience) having a mol. wt. of 150.000 in water and glycerol 50/50 weight to weight, has been emulged with the cellulose triacetate solution and a fiber has been prepared with the procedure disclosed in Example 1.

710 milligrams of the as obtained fiber have been washed five times with 50 mls distilled water each time at room temperature. Then the fiber has been placed in 50 mls of distilled water and the bound acidic groups have been titrated with 0.1 N NaOH using phenolphthaline as the indicator, 2.1 mls of caustic soda solution have been used for the titration. Subsequently the fiber has been subjected to a washing with 50 mls of 1-N HCl and to 5 washings with 50 mls of distilled water each time. On the same fiber sample there has been repeated for 5 times the procedure of titration with 0.1-N NaOH, regeneration with 1-N HCl and washing with distilled water, the same results having been obtained. The volumes of NaOH which have been used had been the following: 2.32 mls; 1.97 mls; 2.02 mls; 2.14 mls; 2.21 mls.

From the average of the results which have been obtained, the summing up is that the polyacrylic acid bound in 710 milligrams of fiber corresponds to 0.21 milliequivalents.

What we claim is:

1. A method for preparing a sequestering structure in filamentary form consisting essentially of the steps of:
    (a) dissolving a filament-forming polymer selected from the group consisting of cellulose polymers, polyamides, acrylonitrile polymers and copolymers, butadiene and isoprene copolymers, acrylate polymers and copolymers, methacrylate polymers and copolymers, vinyl ester polymers and copolymers, vinyl chloride polymers and copolymers, vinylidene chloride polymers and copolymers, styrene polymers and copolymers, vinyl butyrate polymers and copolymers, and gamma-methyl glutamate polymers and copolymers in a solvent which is immiscible with water and mixtures of water and glycerol;
    (b) dissolving the sequestering agent consisting of dextran, acrylimide-acrylic acid copolymers, carboxy methyl cellulose, p-amino benzyl cellulose, polyethyleneimine hydrochloride, albumin, poly-L-lysine hydrobromide and polyacrylic acid which is chemically non-reactive with the filament-forming polymer in a solvent selected from the group consisting of water or mixtures of water and glycerol to form a disperse solution;
    (c) adding the disperse solution containing the sequestering agent to the solution containing the filament-forming polymer;
    (d) stirring the disperse solution containing the sequestering agent and the solution containing the filament-forming polymer until a homogeneous emulsion is obtained;
    (e) spinning the homogeneous emulsion through a spinneret submerged in a coagulation bath;
    (f) collecting the polymer fibers having sequestering agents occluded therein; and
    (g) removing the coagulation liquor and the polymer solvent from the fiber.

2. The method as set forth in claim 1 wherein the filament-forming polymer is cellulose triacetate and the sequestering agent is selected from the group consisting of polyethyleneimine hydrochloride, albumin, poly-L-lysine hydrobromide and polyacrylic acid.

3. A sequestering structure in filamentary form having occluded therein a sequestering agent selected from the group consisting of dextran, acrylimide-acrylic acid copolymers, carboxy methyl cellulose, p.amino benzyl cellulose, polyethyleneimine hydrochloride, albumin, poly-L-lysine hydrobromide and polyacrylic acid prepared by the method consisting essentially of:
    (a) dissolving a filament-formng polymer in a solvent which is immiscible with water and mixtures of water and glycerol;
    (b) dissolving the sequestering agent which is chemically non-reactive with the filament-forming polymer in a solvent from the group consisting of water or mixtures of water and glycerol to form a disperse solution;
    (c) adding the disperse solution containing the sequestering agent to the solution containing the filament-forming polymer;
    (d) stirring the disperse solution containing the sequestering agent and the solution containing the filament-forming polymer until a homogeneous emulsion is obtained;
    (e) spinning the homogeneous emulsion through a spinneret submerged in a coagulation bath;
    (f) collecting the polymer fibers having sequestering agents occluded therein; and
    (g) removing the coagulation liquor and the polymer solvent from the fiber.

4. A structure as claimed in claim 3 wherein the fiber forming polymer is selected from the group consisting of cellulose polymers, polyamides, acrylonitrile polymers and copolymers, butadiene and isoprene copolymers, acrylate polymers and copolymers, methacrylate polymers and copolymers, vinyl ester polymers and copolymers, vinyl chloride polymers and copolymers, vinylidene chloride polymers and copolymers, styrene polymers and copolymers, vinyl butyrate polymers and copolymers, and gamma-methyl glutamate polymers and copolymers.

5. A structure as claimed in claim 4 wherein said filament-forming polymer is cellulose triacetate and said sequestering agent is selected from the group consisting of polyethyleneimine hydrochloride, albumin, poly-L-lysine hydrobromide and polyacrylic acid.

* * * * *